(12) United States Patent
Chen

(10) Patent No.: US 7,997,389 B2
(45) Date of Patent: Aug. 16, 2011

(54) BICYCLE WITH FRONT AND REAR DISK BRAKES OPERABLE APPROXIMATELY SIMULTANEOUSLY

(75) Inventor: I-De Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 831 days.

(21) Appl. No.: 11/987,472

(22) Filed: Nov. 30, 2007

(65) Prior Publication Data

US 2009/0140507 A1 Jun. 4, 2009

(51) Int. Cl.
*B62L 3/02* (2006.01)
*B60T 11/16* (2006.01)
*B60T 11/224* (2006.01)

(52) U.S. Cl. .................... 188/24.22; 188/26; 188/344

(58) Field of Classification Search ............... 188/24.11, 188/24.12, 24.22, 26, 344
See application file for complete search history.

(56) References Cited

U.S. PATENT DOCUMENTS 5,950,772 A * 9/1999 Buckley et al. ............. 188/26
6,193,030 B1 * 2/2001 Kuo ............................. 188/344

* cited by examiner

*Primary Examiner* — Thomas J Williams
(74) *Attorney, Agent, or Firm* — Harness, Dickey & Pierce, P.L.C.

(57) ABSTRACT

A bicycle includes front and rear disk brake units. The rear disk brake unit includes a rear brake lever unit, a rear brake disk, a rear caliper device, and a rear brake oil tube interconnecting the rear brake lever unit and the rear caliper device and having a first inner diameter. The front disk brake unit includes a front brake lever unit, a front brake disk, a front caliper device, and a front brake oil tube interconnecting the front brake lever unit and the front caliper device and having a second inner diameter greater than the first inner diameter so as to allow for approximate simultaneous clamping of the front and rear caliper devices on the front and rear brake disks, respectively, when the front and rear brake lever units are operated simultaneously.

11 Claims, 5 Drawing Sheets

BICYCLE WITH FRONT AND REAR DISK BRAKES OPERABLE APPROXIMATELY SIMULTANEOUSLY

BACKGROUND OF THE INVENTION

1. Field of the Invention

This invention relates to a bicycle, and more particularly to a bicycle that includes front and rear disk brakes operable approximately simultaneously.

2. Description of the Related Art

A conventional bicycle includes front and rear disk brake units that have brake oil tubes, which are made of the same material and which have the same inner diameter. Since the brake oil tube of the rear disk brake unit is longer than that of the front disk brake unit, when brake levers are operated simultaneously, front and rear wheels of the bicycle are stopped through hydraulic operation of caliper devices of the front and rear disk brake units at different times, thereby affecting adversely the balance of the bicycle.

SUMMARY OF THE INVENTION

The object of this invention is to provide a bicycle that includes front and rear disk brake units, which have front and rear caliper devices operable approximately simultaneously.

Accordingly, the bicycle of this invention includes front and rear disk brake units. The rear disk brake unit includes a rear brake lever unit, a rear brake disk, a rear caliper device, and a rear brake oil tube interconnecting the rear brake lever unit and the rear caliper device and having a first inner diameter. The front disk brake unit includes a front brake lever unit, a front brake disk, a front caliper device, and a front brake oil tube interconnecting the front brake lever unit and the front caliper device and having a second inner diameter greater than the first inner diameter so as to allow for approximate simultaneous clamping of the front and rear caliper devices on the front and rear brake disks, respectively, when the front and rear brake lever units are operated simultaneously.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
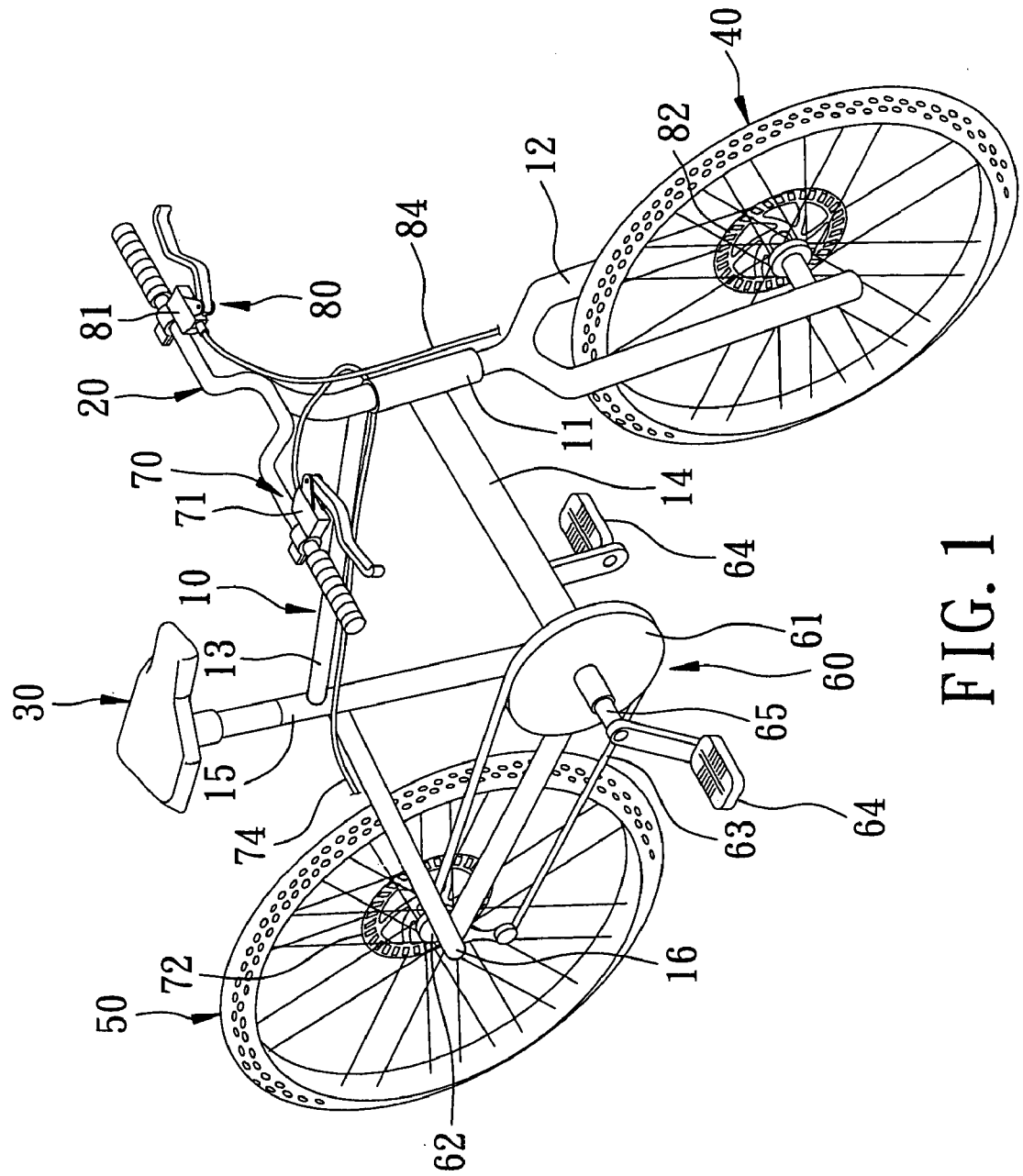
FIG. 1 is a perspective view of the preferred embodiment of a bicycle according to this invention.
Figure 2:
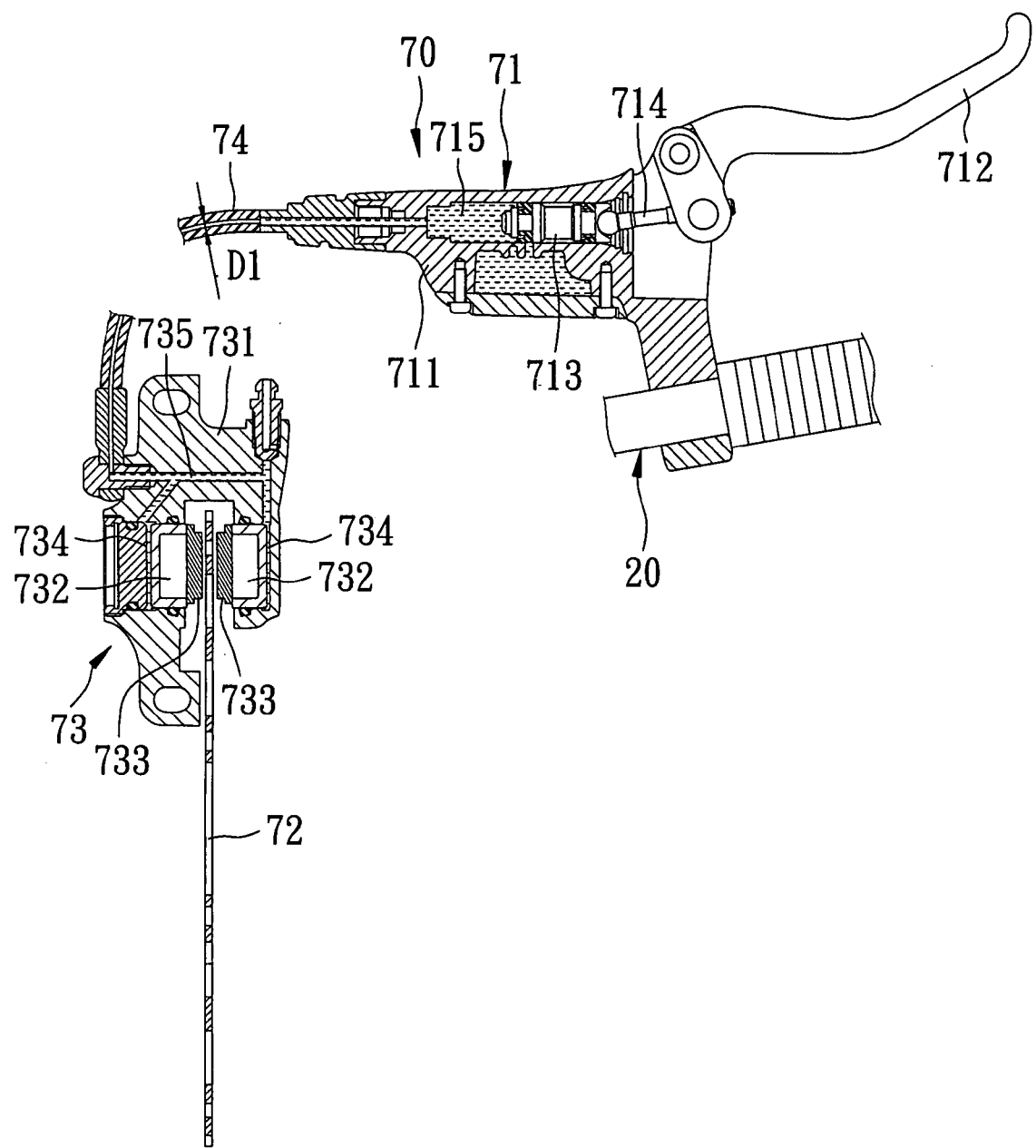
FIG. 2 is a schematic sectional view of a rear disk brake unit of the preferred embodiment when a lever member of the rear disk brake unit is in a non-pressed state.

Referring to FIGS. 1 and 2, the preferred embodiment of a bicycle according to this invention includes a frame 10, a handle 20, a seat 30, a front wheel unit 40, a rear wheel unit 50, a driving unit 60, a rear disk brake unit 70, and a front disk brake unit 80.

The frame 10 includes a head tube 11, a front fork 12, a top tube 13, a down tube 14, a seat tube 15, a rear fork 16, and a bottom bracket (not shown).

The handle 20 is disposed on the head tube 11.

The seat 30 is disposed on the seat tube 15.

The front wheel unit 40 is disposed rotatably on the front fork 12.

The rear wheel unit 50 is disposed rotatably on the rear fork 16 and behind the front wheel unit 40.

The driving unit 60 is disposed on the frame 10, and is operable to rotate the rear wheel unit 50. The driving unit 60 includes a front sprocket 61, a rear sprocket 62, a chain 63 trained on the front and rear sprockets 61, 62, two pedal units 64, and a crankshaft 65 disposed on the bottom bracket and connected to the front sprocket 61 and the pedal units 64.

Figure 4:
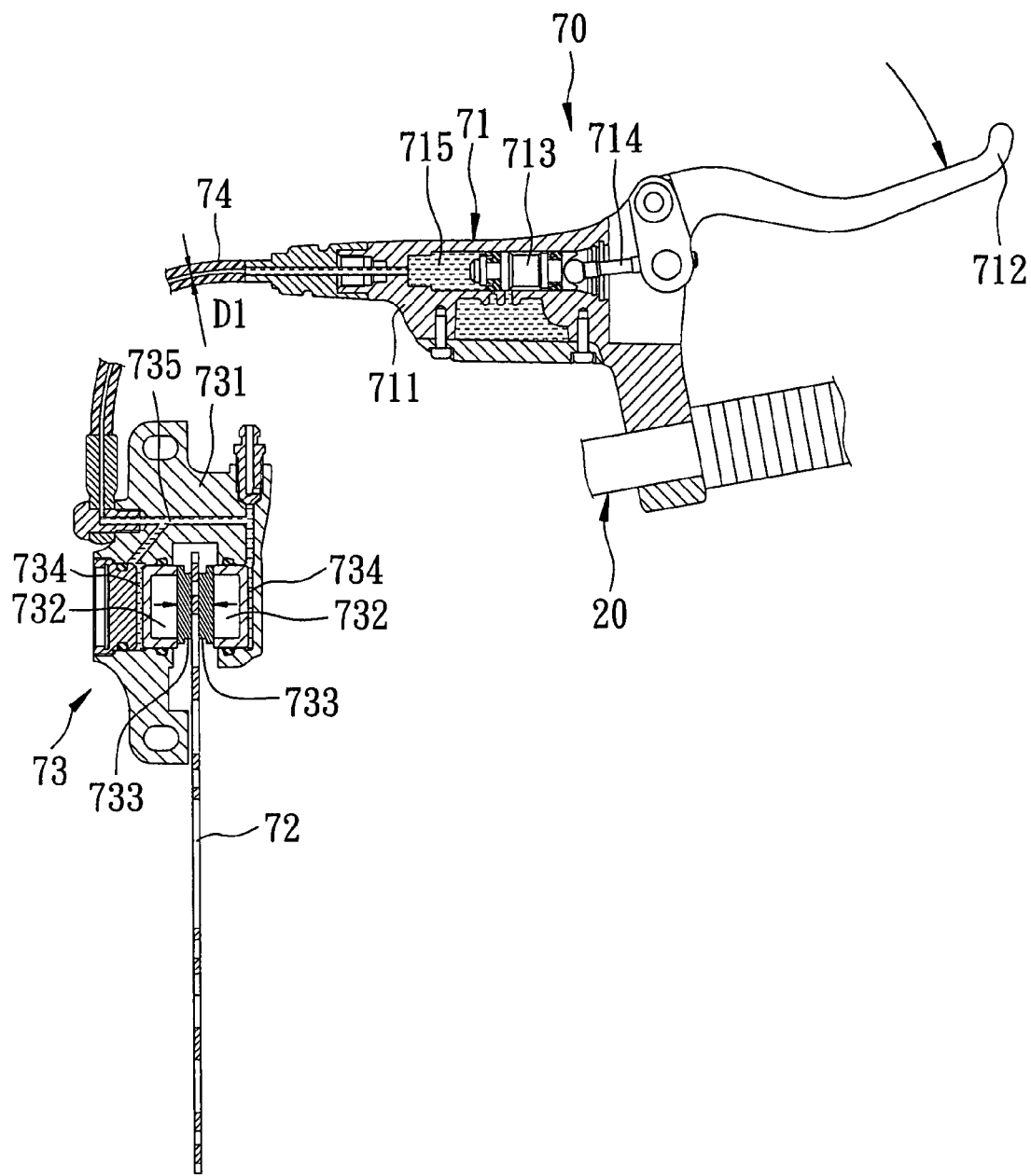
FIG. 4 is a view similar to FIG. 2 but illustrating the lever member of the rear disk brake unit in a pressed state.

With further reference to FIGS. 2 and 4, the rear disk brake unit 70 includes a rear brake lever unit 71 disposed on the handle 20, a rear brake disk 72 disposed on the rear wheel unit 50, a rear caliper device 73 disposed on the rear fork 16 and in proximity to the rear wheel unit 50, and a rear brake oil tube 74 interconnecting the rear brake lever unit 71 and the rear caliper device 73.

In this embodiment, the rear brake lever unit 71 includes a body 711 disposed on the handle 20 and having a first oil chamber 715, a lever member 712 disposed pivotally on the body 711, a first piston 713 disposed movably within the first oil chamber 715, and a link 714 having two ends connected respectively and pivotally to the first piston 713 and the lever member 712.

The rear caliper device 73 includes a seat 731 disposed on the rear fork 16 and formed with two second oil chambers 734 and an oil passage unit 735 in fluid communication with the second oil chambers 734, two second pistons 732 disposed respectively and movably within the second oil chambers 734 in the seat 731 and located respectively to two sides of the rear brake disk 72, and two brake shoes 733 attached respectively and fixedly to the second pistons 732 and movable toward and away from the rear brake disk 72.

The rear brake oil tube 74 has a first inner diameter D1, and is made of a material having a first expansion efficiency. The rear brake oil tube 74 is connected between the body 711 of the rear brake lever unit 71 and the seat 731 of the rear caliper device 73, and is in fluid communication with the first oil chamber 715 in the body 711 and the oil passage unit 735 in the seat 731.

The lever member 712 of the rear brake lever unit 71 is convertible between a non-pressed state shown in FIG. 2 and a pressed state shown in FIG. 4. The brake shoes 733 of the rear caliper device 73 are convertible between a release state shown in FIG. 2 and a clamping state shown in FIG. 4. When the lever member 712 is converted from the non-pressed state into the pressed state, brake oil flows from the first oil chamber 715 into the rear brake oil tube 74, and therefore from the passage unit 735 into the second oil chambers 734. As a result, the brake shoes 733 are converted from the release state into the clamping state to prevent rotation of the rear brake disk 72 and, thus, the rear wheel unit 50.

Figure 3:
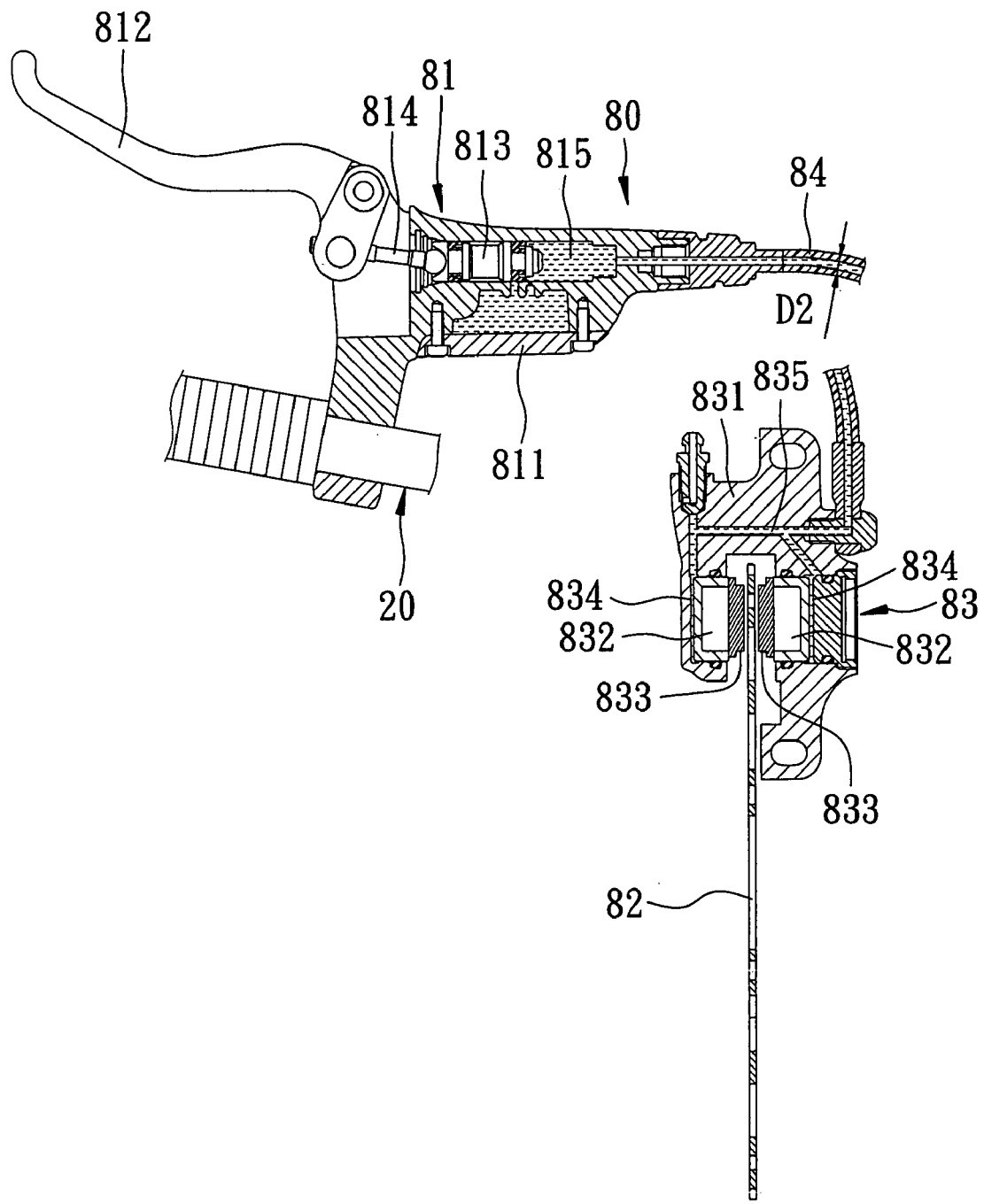
FIG. 3 is a schematic sectional view of a front disk brake unit of the preferred embodiment when a lever member is in a non-pressed state.
Figure 5:
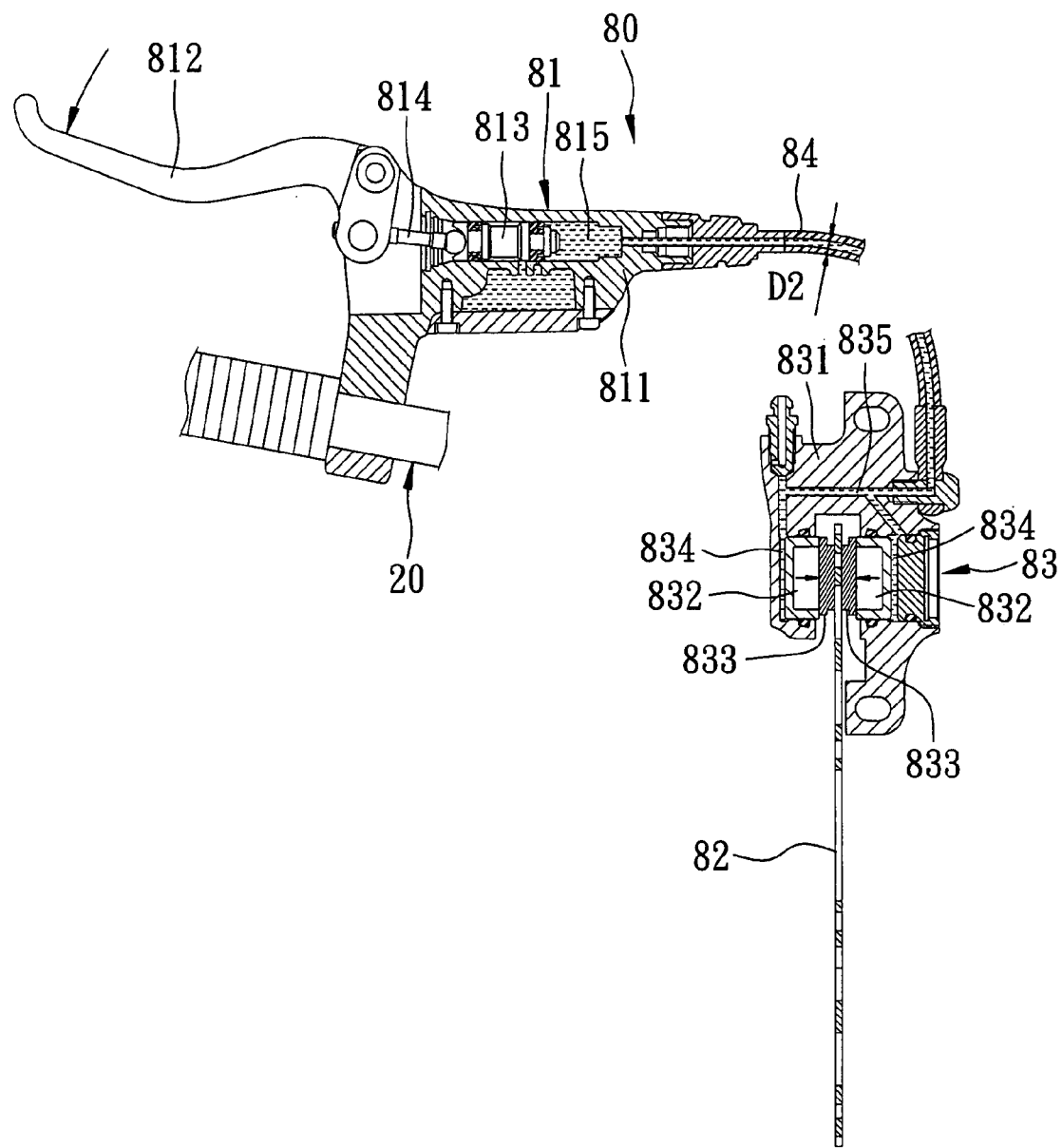
FIG. 5 is a view similar to FIG. 3 but illustrating the lever member of the front disk brake unit in a pressed state.

With further reference to FIGS. 3 and 5, the front disk brake unit 80 includes a front brake lever unit 81 disposed on the handle 20, a front brake disk 82 disposed on the front wheel unit 40, a front caliper device 83 disposed on the front fork 12 and in proximity to the front wheel unit 40, and a front brake oil tube 84 interconnecting the front brake lever unit 81 and the front caliper device 83.

In this embodiment, the front brake lever unit 81 includes a body 811 disposed on the handle 20 and having a first oil chamber 815, a lever member 812 disposed pivotally on the body 811, a first piston 813 disposed movably within the first oil chamber 815, and a link 814 having two ends connected respectively and pivotally to the first piston 813 and the lever member 812.

The front caliper device 83 includes a seat 831 disposed on the front fork 12 and formed with two second oil chambers 834 and an oil passage unit 835 in fluid communication with the second oil chambers 834, two second pistons 832 disposed respectively and movably within the second oil chambers 834 in the seat 831 and located respectively to two sides of the front brake disk 82, and two brake shoes 833 attached respectively and fixedly to the second pistons 832 and movable toward and away from the front brake disk 82.

The front brake oil tube 84 has a second inner diameter D2 greater than the first inner diameter D1, and is made of a material having a second expansion efficiency greater than the first expansion efficiency. The front brake oil tube 84 is connected between the body 811 of the front brake lever unit 81 and the seat 831 of the front caliper device 83, and is in fluid communication with the first oil chamber 815 in the body 811 and the oil passage unit 835 in the seat 831.

The lever member 812 of the front brake lever unit 81 is convertible between a non-pressed state shown in FIG. 3 and a pressed state shown in FIG. 5. The brake shoes 833 of the front caliper device 83 are convertible between a release state shown in FIG. 3 and a clamping state shown in FIG. 5. When the lever member 812 is converted from the non-pressed state into the pressed state, brake oil flows from the first oil chamber 815 into the front brake oil tube 84, and therefore from the passage unit 835 into the second oil chambers 834. As a result, the brake shoes 833 are converted from the release state into the clamping state to prevent rotation of the front brake disk 82 and, thus, the front wheel unit 40.

When the rider applies the same force to press against the lever members 812, 712 of the front and rear brake lever units 80, 70, since the second inner diameter D2 and the second expansion efficiency are greater than the first inner diameter D1 and the first expansion efficiency, respectively, the flow rate of brake oil in the rear brake oil tube 74 is faster than that of brake oil in the front brake oil tube 84.

As such, although the rear brake oil tube 74 is longer than the front brake oil tube 84 so that a frictional resistance experienced by brake oil within the rear brake oil tube 74 is greater than that experienced by brake oil within the front brake oil tube 84, this difference in resistance can be compensated for by the increased brake oil flow rate in the rear brake oil tube 74.

Due to the different inner diameters D2, D1 and the different expansion efficiencies of the front and rear disk brake units 80, 70, when the lever members 812, 712 of the front and rear brake lever units 81, 71 are operated simultaneously using the same force, the front and rear brake shoes 833, 733 can be clamped approximately simultaneously on the front and rear brake disks 82, 72, respectively. This maintains the balance of the bicycle, particularly, during an emergency braking operation.

With this invention thus explained, it is apparent that numerous modifications and variations can be made without departing from the scope and spirit of this invention. It is therefore intended that this invention be limited only as indicated by the appended claims.

I claim:

1. A bicycle comprising:
a frame;
a handle disposed on said frame;
a front wheel unit disposed rotatably on said frame;
a rear wheel unit disposed rotatably on said frame and behind said front wheel unit;
a rear disk brake unit including a rear brake lever unit disposed on said handle, a rear brake disk disposed on said rear wheel unit, a rear caliper device disposed on said frame, and a rear brake oil tube having two ends connected respectively and directly to said rear brake lever unit and said rear caliper device, and a first inner diameter; and
a front disk brake unit including a front brake lever unit disposed on said handle, a front brake disk disposed on said front wheel unit, a front caliper device disposed on said frame, and a front brake oil tube having two ends connected respectively and directly to said front brake lever unit and said front caliper device, and a second inner diameter greater than said first inner diameter;
wherein said rear brake oil tube is made of a material having a first expansion efficiency, and said front brake oil tube is made of a material having a second expansion efficiency greater than said first expansion efficiency.

2. The bicycle as claimed in claim 1, wherein said rear brake lever unit includes a body disposed on said handle and having a first oil chamber, a lever member disposed pivotally on said body, a first piston disposed movably within said first oil chamber in said body, and a link having two ends connected respectively and pivotally to said first piston and said lever member.

3. The bicycle as claimed in claim 2, wherein said rear caliper device includes a seat disposed on said frame and formed with two second oil chambers and an oil passage unit in fluid communication with said second oil chambers, two second pistons disposed respectively and movably within said second oil chambers in said seat and located respectively to two sides of said rear brake disk, and two brake shoes attached respectively and fixedly to said second pistons and movable toward and away from said brake disk, said rear brake oil tube being connected between said rear brake lever unit and said seat of said rear caliper device and in fluid communication with said first oil chamber in said body and said oil passage unit in said seat.

4. The bicycle as claimed in claim 1, wherein said front brake lever unit includes a body disposed on said handle and having a first oil chamber, a lever member disposed pivotally on said body, a first piston disposed movably within said first oil chamber in said body, and a link having two ends connected respectively and pivotally to said first piston and said lever member.

5. The bicycle as claimed in claim 4, wherein said front caliper device includes a seat disposed on said frame and formed with two second oil chambers and an oil passage unit in fluid communication with said second oil chambers, two second pistons disposed respectively and movably within said second oil chambers in said seat and located respectively to two sides of said front brake disk, and two brake shoes attached respectively and fixedly to said second pistons and movable toward and away from said front brake disk, said front brake oil tube being connected between said front brake lever unit and said seat of said front caliper device and in fluid communication with said first oil chamber in said body and said oil passage unit in said seat.

6. The bicycle as claimed in claim 1, wherein said rear brake lever unit includes a lever member convertible between a non-pressed state and a pressed state, and said rear caliper device includes two brake shoes convertible between a release state and a clamping state, wherein, when said lever member is converted from said non-pressed state into said pressed state, said brake shoes are converted from said release state into said clamping state to prevent rotation of said rear brake disk.

7. The bicycle as claimed in claim 1, wherein said front brake lever unit includes a lever member convertible between a non-pressed state and a pressed state, and said front caliper device includes two brake shoes convertible between a release state and a clamping state, wherein, when said lever member is converted from said non-pressed state into said pressed state, said brake shoes are converted from said release state into said clamping state to prevent rotation of said front brake disk.

8. The bicycle as claimed in claim 1, further comprising a seat mounted on said frame.

9. The bicycle as claimed in claim 1, further comprising a driving unit disposed on said frame and operable to rotate said rear wheel unit.

10. A bicycle comprising:
a frame;
a handle disposed on said frame;
a front wheel unit disposed rotatably on said frame;
a rear wheel unit disposed rotatably on said frame and behind said front wheel unit;
rear disk brake unit including a rear brake lever unit disposed on said handle, a rear brake disk disposed on said rear wheel unit, a rear caliper device disposed on said frame, and a rear brake oil tube interconnecting said rear brake lever unit and said rear caliper device and made of a material having a first expansion efficiency; and
a front disk brake unit including a front brake lever unit disposed on said handle, a front brake disk disposed on said front wheel unit, a front caliper device disposed on said frame, and a front brake oil tube interconnecting said front brake lever unit and said front caliper device and made of a material having a second expansion efficiency greater than said first expansion efficiency so as to allow for approximate simultaneous clamping of said front and rear caliper devices on said front and rear brake disks, respectively, when said front and rear brake lever units are operated simultaneously.

11. The bicycle as claimed in claim 10, wherein said rear brake oil tube has a first inner diameter, and said front brake oil tube has a second inner diameter greater than said first inner diameter.

* * * * *